Figures 1, 2:
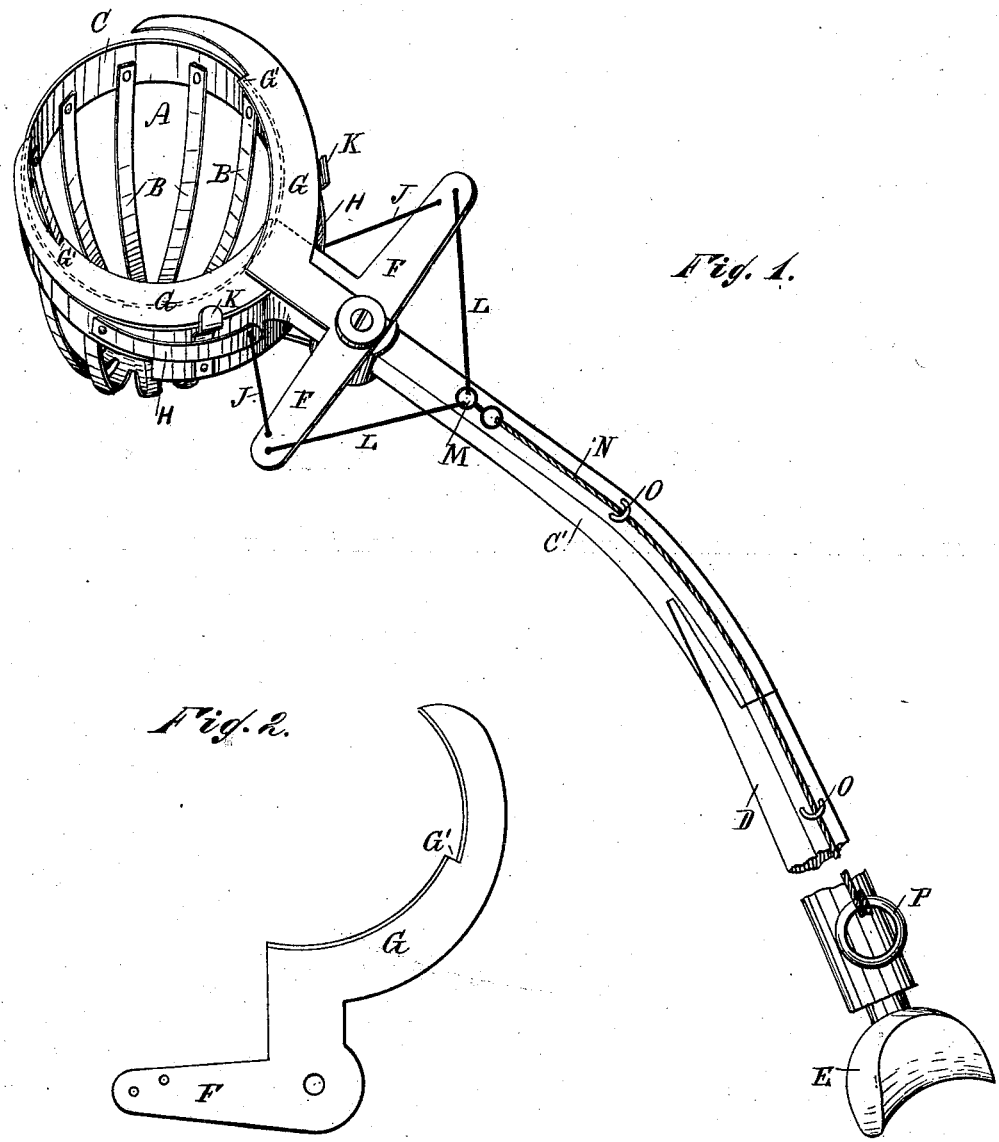

(Model.)

J. R. & J. A. WILLIAMSON.
FRUIT PICKER.

No. 256,421. Patented Apr. 11, 1882.

WITNESSES:
Theo. G. Hoster
C. Sedgwick

INVENTOR:
J. R. Williamson
J. A. Williamson
BY Munn & Co
ATTORNEYS.

UNITED STATES PATENT OFFICE.

JAMES R. WILLIAMSON AND JOSEPH A. WILLIAMSON, OF BRUNSWICK, GA.

FRUIT-PICKER.

SPECIFICATION forming part of Letters Patent No. 256,421, dated April 11, 1882.

Application filed October 10, 1881. (Model.)

*To all whom it may concern:*

Be it known that we, JAMES ROBERT WILLIAMSON and JOSEPH ANDREW WILLIAMSON, of Brunswick, in the county of Glynn and State of Georgia, have invented a new and Improved Fruit-Picker, of which the following is a full, clear, and exact description.

The invention consists of a basket attached to the end of a long handle, on which is pivoted a clipping-knife or shears, formed of two crossed angular blades provided with a shoulder or offset in the cutting-edge, and which are held open by springs to admit the fruit into the basket, and are closed by pulling a cord attached to the ends of these angular blades and passing down to the lower end of the handle, whereby the stem of the fruit will be clipped, the fruit dropping into the basket.

Reference is to be had to the accompanying drawings, forming part of this specification, in which similar letters of reference indicate corresponding parts in both figures.

Figure 1 is a perspective view of our improved fruit-picker. Fig. 2 is a plan view of one of the blades.

A basket, A, formed of a series of metal strips, B, is attached to a ring, C, which is fastened to a bent casting or knee-piece, C', attached to the upper end of a handle-rod, D, which has a detachable knee-rest, E, at its lower end. The handle D is so constructed that it can be lengthened by adding more sections of the same. A clipping or cutting knife or shear is composed of two crossed angular blades, F, made of steel, and provided with sharp curved cutting-edges G, provided with an offset or shoulder, G', and is pivoted to the upper end of the handle in such a manner that the blades rest on the upper edge of the ring C when the clipping-knife is open. Spring-strips H are attached to the outer side of the ring C, and the free ends of these springs are connected by means of cords J with the outer ends of the corresponding angular blades, F, whereby these cutting-edges G will be drawn outward to rest against clips K, attached to the outer side of the ring C—that is to say, these springs hold the clipping-knife or shears open. In place of the spring-strips H and the cords J, spiral springs may be attached to the ends of the blades F and to the ring C. Cords L connect the ends of the blades F with a ring, M, at the upper end of a cord, N, guided in loops or staples O on the handle D, and provided at its lower end with a finger-loop, P. By pulling on this cord the cutting-edges G of the blades F will be crossed and will clip the stem of the fruit, the offsets G' forming sharp corners, which enter the stem. As soon as the cord N is released the springs H will open the clipping-knife again.

The operation is as follows: The handle D is lengthened as much as may be required, and the knee-rest E is placed against the knee or thigh, so as to give the handle D a firm bearing. The upper end of the handle is then raised, so that the fruit to be picked will pass into the basket A, upon which the cord N is pulled, whereby the cutting-edges G of the blades F are crossed, and the stem of the fruit is severed, the fruit dropping into the basket. This device can be used for large fruit—such as apples, pears, or oranges—or small fruit, such as prunes, plums, mulberries, &c. The fruit is not bruised, the trees are not damaged, and the fruit can be picked very rapidly with our improved fruit-picker. The springs H may be dispensed with, if desired, and the picker provided with additional cords for opening or separating the cutting-blades.

Having thus described our invention, we claim as new and desire to secure by Letters Patent—

1. In a fruit-picker, the angular blade F, constructed, substantially as herein shown and described, with a curved cutting-edge, G, having an offset or shoulder, G', as set forth.

2. In a fruit-picker, the combination, with the basket A and the handle D, of the angular blades F, having curved cutting-edges, and pivoted to the said handle, and the springs H, having one end secured to the basket and the other connected to the blades by cords J, substantially as shown and described, whereby the said blades will be held open, as set forth.

3. In a fruit-picker, the combination, with the basket A, the handle D, and the angular blades F, pivoted to the said handle, of the springs H, having one end secured to the basket and their free ends connected to the blades by cords J, the cords L, and the cord M, substantially as and for the purpose set forth.

4. In a fruit-picker, the combination, with the handle D and the basket A, provided with the clips K and the springs H, of the angular pivoted blades F, the cords J, connecting the said springs and blades together, and the cords L N, substantially as and for the purpose set forth.

5. In a fruit-picker, the combination, with the handle D, of the removable knee-piece E, substantially as and for the purpose set forth.

JAMES ROBERT WILLIAMSON.
JOSEPH ANDREW WILLIAMSON.

Witnesses:
R. M. TISON,
M. G. LOWE,
T. O'CONNOR, Jr.